US012671189B2

(12) United States Patent
Kambara et al.

(10) Patent No.: US 12,671,189 B2
(45) Date of Patent: Jun. 30, 2026

(54) ELECTROMAGNETIC WAVE REFLECTING DEVICE, ELECTROMAGNETIC WAVE REFLECTING FENCE, AND REFLECTION PANEL

(71) Applicant: AGC Inc., Tokyo (JP)

(72) Inventors: Kumiko Kambara, Tokyo (JP); Shinji Ueki, Tokyo (JP)

(73) Assignee: AGC INC., Tokyo (JP)

( * ) Notice: Subject to any disclaimer, the term of this patent is extended or adjusted under 35 U.S.C. 154(b) by 46 days.

(21) Appl. No.: 18/957,545

(22) Filed: Nov. 22, 2024

(65) Prior Publication Data

US 2025/0096479 A1 Mar. 20, 2025

Related U.S. Application Data

(63) Continuation of application No. PCT/JP2023/016646, filed on Apr. 27, 2023.

(30) Foreign Application Priority Data

Jun. 1, 2022 (JP) ................................ 2022-089850

(51) Int. Cl.

*H01Q 15/14* (2006.01)
*H01Q 15/00* (2006.01)
*H01Q 21/06* (2006.01)

(52) U.S. Cl.

CPC ......... *H01Q 15/14* (2013.01); *H01Q 15/0086* (2013.01); *H01Q 21/065* (2013.01)

(58) Field of Classification Search

CPC ... H01Q 15/14; H01Q 15/0086; H01Q 21/065

See application file for complete search history.

(56) References Cited

PUBLICATIONS

Diaz-Rubio et al., "From the generalized reflection law to the realization of perfect anomalous reflectors," Science Advances, vol. 3, Aug. 11, 2017, pp. e1602714-1 to e1602714-10.

Diaz-Rubio et al., "Supplementary Materials for: From the generalized reflection law to the realization of perfect anomalous reflectors," Science Advances, vol. 3, Aug. 11, 2017, e1602714 (15 pages).

International Searching Authority, "International Search Report," issued in connection with International Patent Application No. PCT/JP2023/016646, dated Jul. 18, 2023.

International Searching Authority, "Written Opinion," issued in connection with International Patent Application No. PCT/JP2023/016646, dated Jul. 18, 2023.

*Primary Examiner* — Graham P Smith

(74) *Attorney, Agent, or Firm* — Foley & Lardner LLP

(57) ABSTRACT

An electromagnetic wave reflecting device includes: a reflection panel that reflects radio waves of a desired band selected from a frequency band of 1 GHz or more and 170 GHz or less, and a frame that holds the reflection panel. The reflection panel includes: a dielectric layer, a periodic conductive pattern provided on one surface of the dielectric layer, a ground layer provided on the other surface of the dielectric layer, and an adhesive layer that bonds the conductive pattern to the one surface of the dielectric layer. The adhesive layer covers an entirety of the one surface of the dielectric layer.

9 Claims, 12 Drawing Sheets

FIG.9

| | | DISSIPATION FACTOR AT 28 GHz | | | | |
|---|---|---|---|---|---|---|
| | | 0.01 | 0.02 | 0.03 | 0.05 | 0.10 |
| RELATIVE PERMITTIVITY AT 28 GHz | 2.0 | A | A | A | A | B |
| | 2.5 | A | A | A | A | B |
| | 3.0 | A | A | B | B | B |
| | 3.5 | A | A | B | – | – |
| | 4.0 | A | A | B | – | – |
| | 4.5 | B | B | B | – | – |

A: POWER REFLECTION EFFICIENCY ≧ 60.0%
B: POWER REFLECTION EFFICIENCY < 60.0%

FIG.10

| | | DISSIPATION FACTOR AT 1 GHz | | | | | | |
|---|---|---|---|---|---|---|---|---|
| | | 0.01 | 0.02 | 0.03 | 0.05 | 0.08 | 0.09 | 0.10 |
| RELATIVE PERMIT-TIVITY AT 1 GHz | 2.1 | A | A | A | A | A | A | B |
| | 2.3 | A | A | A | A | A | A | A |
| | 2.5 | A | A | A | A | A | A | B |
| | 3.0 | A | A | B | – | – | – | B |
| | 3.5 | A | A | B | – | – | – | – |
| | 4.0 | A | A | B | – | – | – | – |
| | 4.5 | B | B | B | – | – | – | – |

A: POWER REFLECTION EFFICIENCY ≧ 60.0%
B: POWER REFLECTION EFFICIENCY < 60.0%

ELECTROMAGNETIC WAVE REFLECTING DEVICE, ELECTROMAGNETIC WAVE REFLECTING FENCE, AND REFLECTION PANEL

CROSS-REFERENCE TO RELATED APPLICATIONS

This application is a continuation application of International Application No. PCT/JP2023/016646 filed on Apr. 27, 2023, and designated the U.S., which is based upon and claims priority to Japanese Patent Application No. 2022-089850 filed on Jun. 1, 2022, the entire contents of which are incorporated herein by reference.

TECHNICAL FIELD

The present invention relates to an electromagnetic wave reflecting device, an electromagnetic wave reflecting fence, and a reflection panel.

BACKGROUND

While high-speed and large-capacity communication is expected in the fifth-generation (hereinafter "5G") mobile communication standard, there may be places where radio waves are difficult to reach due to a use of radio waves having high straight-line propagation properties. A means for delivering radio waves to a target terminal device or radio equipment is demanded in a place where many metal machines exist, such as a factory, or in a place where there are many reflections on wall surfaces or roadside trees, such as a street high-rise office building. A similar request arises for a non-line-of-sight (NLOS) sites where a base station antenna cannot be seen unobstructed, such as a medical site, an event venue, large commercial facilities, and the like.

In recent years, reflective surfaces with artificial surfaces called "metasurfaces" have been developed. A metasurface consists of a periodic structure or pattern finer than a wavelength, and is designed to reflect radio waves in a desired direction (for example, see Diaz-Rubio et al., Sci. Adv. 2017:3: e1602714 1). A metasurface itself is realized by a periodically repeated fine structure or metal pattern; in actual manufacturing of metasurfaces, a metal pattern is often provided on one surface of a dielectric substrate, and a ground layer is often provided on the opposite surface. Since the metasurface can realize a desired reflection angle and maintain a planar arrangement configuration at the same time, the metasurface effectively functions as a reflector even in an environment where there is no spatial margin for installing a large number of electromagnetic wave reflection panels.

A metal pattern and a ground layer are often made of a metal having good conductivity, such as copper (Cu), nickel (Ni), or silver (Ag). A reflective surface including a metasurface functions through its metal pattern and therefore requires precise patterning. A ground layer is formed on one surface of a dielectric substrate through a process such as sputtering or vapor deposition. A metal pattern may be formed through etching, electroplating, or the like.

SUMMARY

According to one embodiment, an electromagnetic wave reflecting device includes: a reflection panel that reflects radio waves of a desired band selected from a frequency band of 1 GHz or more and 170 GHz or less, and a frame that holds the reflection panel. The reflection panel includes: a dielectric layer, a periodic conductive pattern provided on one surface of the dielectric layer, a ground layer provided on the other surface of the dielectric layer, and an adhesive layer that bonds the conductive pattern to the one surface of the dielectric layer. The adhesive layer covers an entirety of the one surface of the dielectric layer, and in a range of 1 GHz or more and 30 GHz or less, a relative permittivity of the adhesive layer is 2.0 or greater and less than 3.0 and a dissipation factor of the adhesive layer is greater than 0.00 and less than 0.10, or a relative permittivity of the adhesive layer is 3.0 or greater and less than 4.5 and a dissipation factor of the adhesive layer is greater than 0.00 and 0.02 or less.

BRIEF DESCRIPTION OF THE DRAWINGS

FIG. 9 is a diagram illustrating a relationship between a relative permittivity and a dissipation factor of an adhesive layer at 28 GHz and a power reflection efficiency; and FIG. 10 is a diagram illustrating a relationship between a relative permittivity and a dissipation factor of an adhesive layer at 1 GHz and a power reflection efficiency.

DETAILED DESCRIPTION

Figure 1:
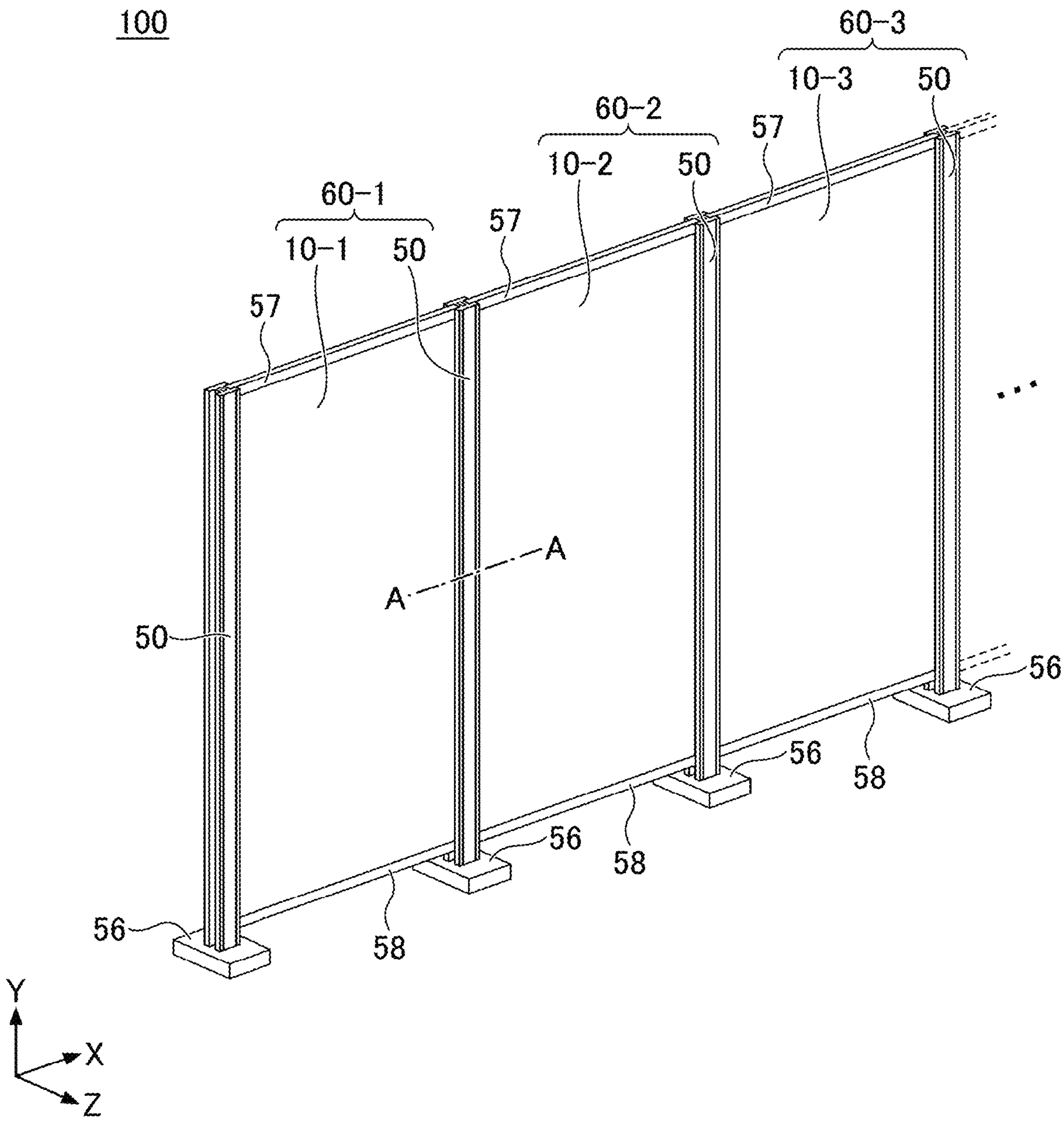
FIG. 1 is a schematic diagram of an electromagnetic wave reflecting fence in which a plurality of electromagnetic wave reflecting devices are joined.

It is not easy to directly form a metal pattern through patterning on one surface of a dielectric substrate whose other surface is formed with a metal ground layer. Bonding a metal pattern to a dielectric substrate with an adhesive layer being interposed therebetween can be considered. In the reflective surface in which the metal pattern is bonded by the adhesive layer, the dielectric constant of the dielectric substrate and the adhesive layer greatly affects the reflection angle and the reflection efficiency. In order to improve the propagation environment, the reflection efficiency is preferably 60% or more, or 70% or more. In particular, if a common acrylic adhesive is applied to the entire surface, the reflection efficiency is reduced to less than 60% and it is difficult to sufficiently improve a propagation environment.

Deterioration in reflection efficiency in an electromagnetic wave reflecting device having a conductive pattern bonded by an adhesive layer can be suppressed.

In order to improve a propagation environment by using an electromagnetic wave reflecting device, it is desirable that the reflection efficiency of the electromagnetic wave reflecting device is 60% or more, preferably 70% or more. In the embodiment, deterioration in reflection efficiency of an electromagnetic wave reflecting device, in which a conductive pattern is bonded to a dielectric layer by an adhesive layer, is suppressed by setting a relative permittivity and a dissipation factor of the dielectric layer within respective predetermined ranges. The term "reflection efficiency" in the descriptions hereinafter refers to a power reflection efficiency, unless specified differently. In the following descriptions, the same components are denoted by the same reference numerals, and a redundant description may be omitted.

FIG. 1 is a schematic diagram of an electromagnetic wave reflecting fence 100 in which a plurality of electromagnetic wave reflecting devices 60-1, 60-2, and 60-3 are joined. Although FIG. 1 illustrates the electromagnetic wave reflecting fence 100 configured by three electromagnetic wave reflecting devices 60-1, 60-2, and 60-3 joined to each other (hereinafter, they may be collectively referred to as "electromagnetic wave reflecting devices 60" as appropriate), the number of the electromagnetic wave reflecting devices 60 to be joined is not particularly limited.

The electromagnetic wave reflecting devices 60-1, 60-2, and 60-3 include reflection panels 10-1, 10-2, and 10-3 (hereinafter, they may be collectively referred to as "reflection panels 10" as appropriate), respectively. The width direction, the height direction, and the thickness direction of the reflection panel 10 are defined as X, Y, and Z directions, respectively. Each of the reflection panels 10 reflects electromagnetic waves of 1 GHz or more and 170 GHz or less, preferably 1 GHz or more and 100 GHz or less, and more preferably 1 GHz or more and 80 GHz or less. Each of the reflection panels 10 has, as a reflection film, a conductive pattern or a conductive film designed according to a target reflection mode, a target frequency band, or the like. The conductive film may be formed in a periodic pattern, a mesh pattern, a geometric pattern, a transparent film, or the like. As described later, the deterioration in reflection efficiency of the electromagnetic wave reflecting device 60 is suppressed by designing the relative permittivity and the dissipation factor of an adhesive layer, which is provided on the reflection panel 10-1 to bond a conductive pattern, within respective predetermined ranges.

Each of the reflection panels 10-1, 10-2, and 10-3 may have a specular reflection surface in which an angle of incidence and an angle of emergence of the electromagnetic wave are equal, or may be a non-specular reflection surface in which an angle of incidence and an angle of reflection are different from each other. Examples of the non-specular reflection surface include, in addition to a diffusion surface and a scattering surface, a metasurface which is an artificial reflection surface designed to reflect radio waves in a desired direction.

In some cases, from the viewpoint of maintaining continuity of a reflection potential, the reflection panels 10-1, 10-2, and 10-3 are preferably electrically connected to each other; in the case where the neighboring reflection panels 10 include a metasurface, on the other hand, electrical connections between the neighboring reflection panels 10 may be unnecessary. The neighboring reflection panels 10 are held and connected in the X direction by the frames 50, and an electromagnetic wave reflecting fence 100 is thereby obtained.

The electromagnetic wave reflecting device 60 may include legs 56 for supporting the frame 50 in addition to the reflection panel 10 and the frame 50. As illustrated in FIG. 1, in order to set the electromagnetic wave reflecting device 60 or the electromagnetic wave reflecting fence 100 upright on the installation surface, it is desirable to provide the legs 56, but the legs 56 are not essential. In addition to the frame 50, a top frame 57 for holding the upper end of the reflection panel 10 and a bottom frame 58 for holding the lower end of the reflection panel 10 may be used. In this case, the frame 50, the top frame 57, and the bottom frame 58 constitute a frame that holds the entire periphery of the reflection panel 10. The frame 50 may be referred to as a "side frame" due to its positional relationship with respect to the top frame 57 and the bottom frame 58. Provision of the top frame 57 and the bottom frame 58 ensures the mechanical strength and safety of the reflection panel 10 during transportation and assembly. Depending on purpose of use, the electromagnetic wave reflecting device 60 may be installed on a wall surface or a ceiling, with the reflection panel 10 being held by the frame 50, the top frame 57, and the bottom frame 58.

Figure 2:
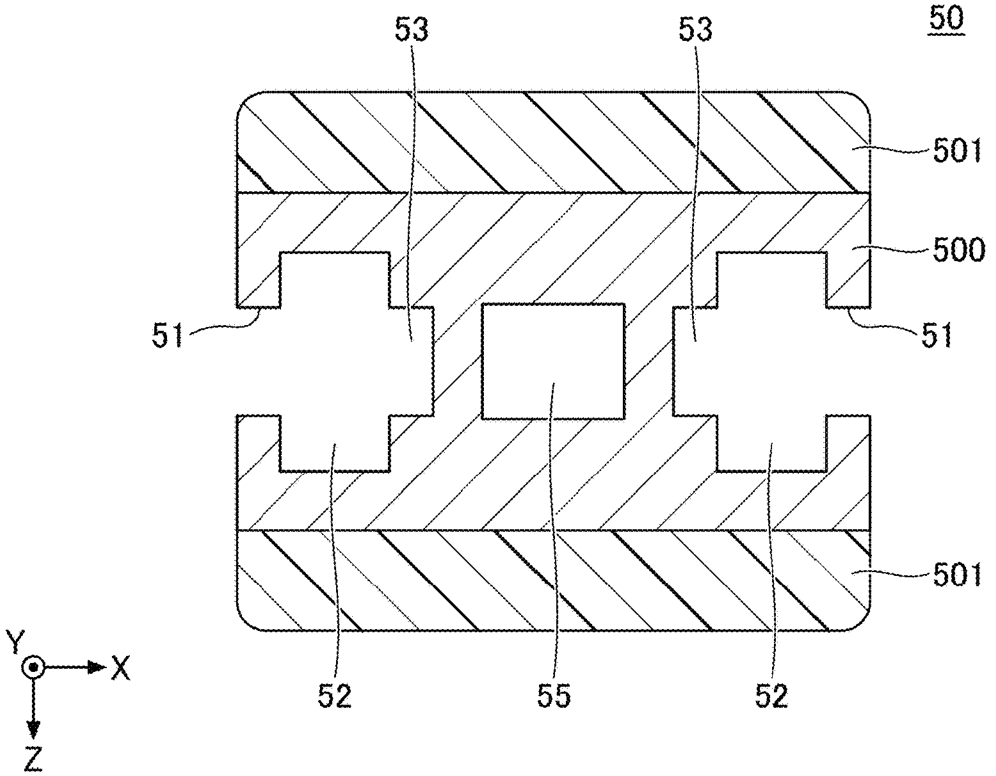
FIG. 2 is a horizontal cross-sectional view of a frame taken along line A-A of FIG. 1.

FIG. 2 is a cross-sectional view of the frame 50 taken along line A-A of FIG. 1, viewed in the section parallel to the XZ plane. The frame 50 includes a conductive main body 500 and slits 51 formed on both sides of the main body 500 in the width direction. The slit 51 holds the side edge of the reflection panel 11. The side edges of the reflection panel 10 are an edge along the Y direction in FIG. 1.

In the main body 500, cavities 52 communicating with the slits 51, grooves 53 provided in the cavities 52, and a hollow 55 not communicating with the cavity 52 and the groove 53 are formed; however, the present invention is not limited to this example. The groove 53 is provided at a position facing the slit 51 with the cavity 52 interposed therebetween, and holds the side edge of the reflection panel 10 that is inserted from the slit 51. The weight of the frame 50 can be reduced by providing the cavities 52 and the hollow 55 in the frame 50. Provision of the grooves 53 in the cavities 52 reinforces the retention of the reflection panels 10.

Non-conductive covers 501, such as resin-made covers, may be provided on the outer surface of the main body 500 but the covers 501 are not essential. In the case where the covers 501 are provided, the covers 501 function as a protection member that protects the frame 50.

Figure 3:
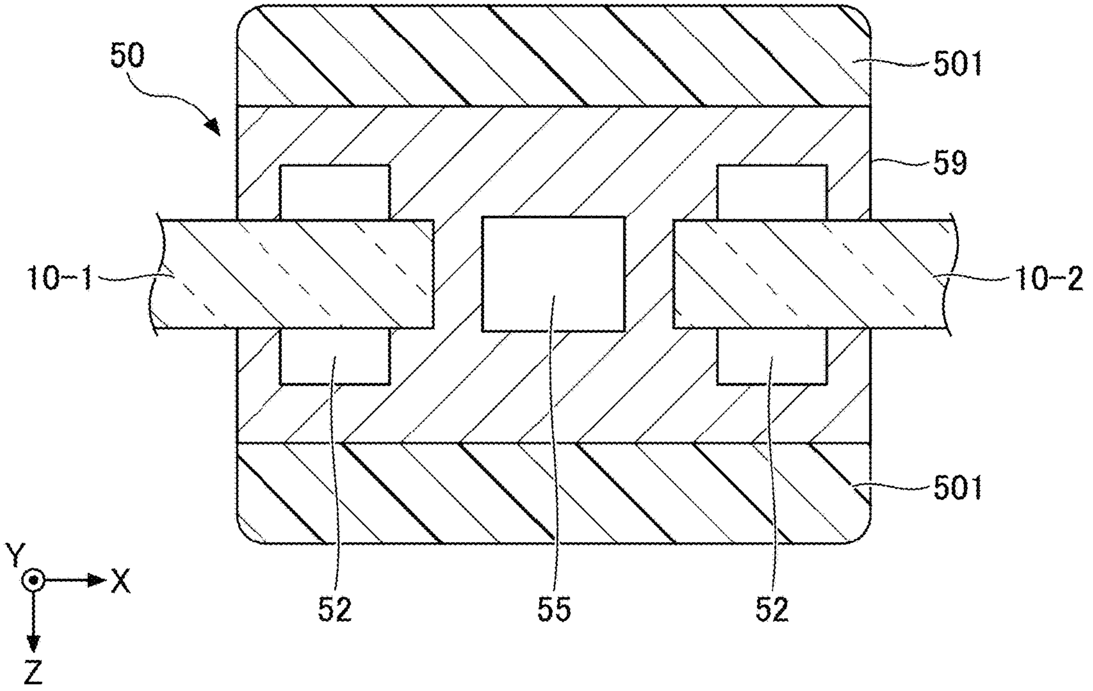
FIG. 3 is a diagram illustrating a state in which a panel is inserted into the frame of FIG. 2.

FIG. 3 is a cross-sectional view parallel to the XZ plane, illustrating the state of insertion of the reflection panels 10 into the frame 50. The reflection panels 10-1 and 10-2 are inserted from the slits 51 (see FIG. 2) on both sides of the main body 500. The reflection panels 10-1 and 10-2 may or may not be in contact with the base surface of the groove 53 by being inserted into the end of the grooves 53 (see FIG. 2) of the cavities 52. The reflection panels 10-1 and 10-2 are inserted into the slits 51, respectively, so that the neighboring reflection panels 10-1 and 10-2 can be stably held. The main body 500 may be partially made of a non-conductive material.

Figure 4A:
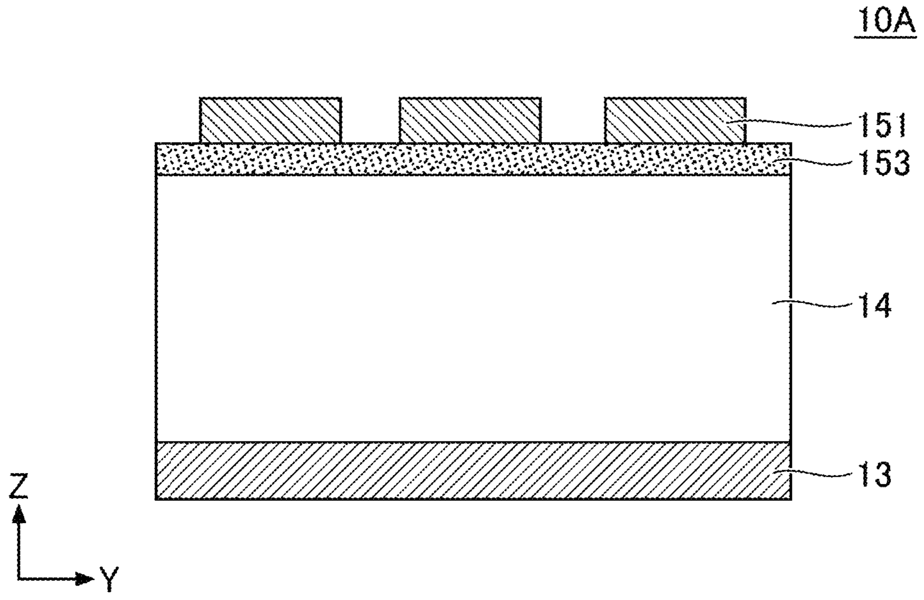
FIG. 4A is a diagram illustrating an example of a layer structure of a reflection panel.
Figure 4B:
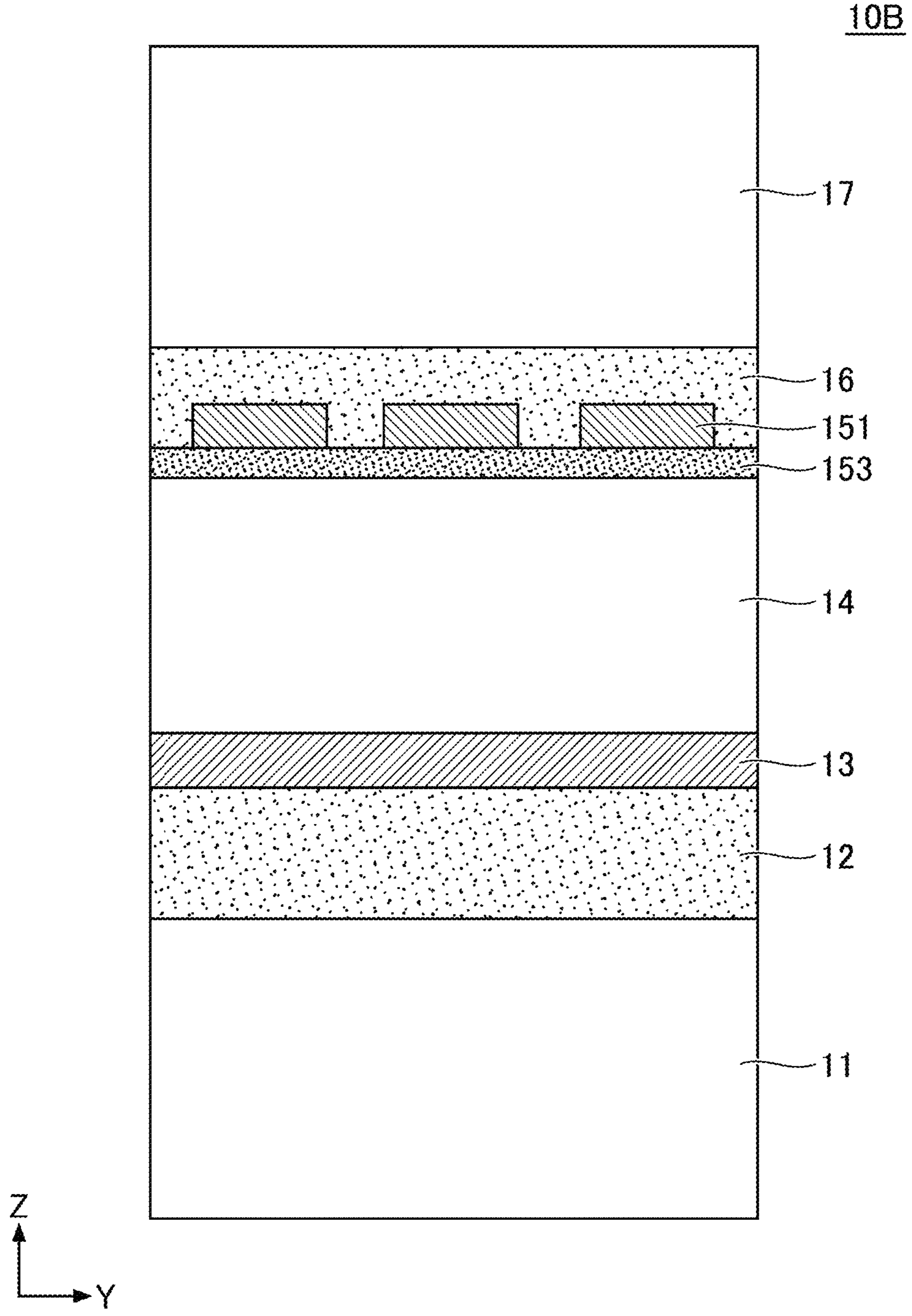
FIG. 4B is a diagram illustrating another example of a layer structure of the reflection panel.

FIGS. 4A and 4B illustrate examples of the layer structure of the reflection panel 10. These layer structures are a layer structure in the thickness (Z) direction of the reflection panel 10. In FIG. 4A, the reflection panel 10A includes a dielectric layer 14, a conductive pattern 151 provided on one of the surfaces of the dielectric layer 14, a ground layer 13 provided on the other of the surfaces of the dielectric layer 14, and an adhesive layer 153 for bonding the conductive pattern 151 to the dielectric layer 14. The adhesive layer 153 covers an entirety of one surface of the dielectric layer 14. As described later, the adhesive layer 153 has a relative permittivity and a dissipation factor within respective predetermined ranges.

The dielectric layer 14 is an insulating polymer film such as polycarbonate, cycloolefin polymer (COP), polyethylene terephthalate (PET), or fluorine resin, and has a thickness of about 0.3 mm to 1.0 mm. The dielectric layer 14 may be made of any material having a dielectric constant and a dielectric loss tangent suitable for realizing target reflection characteristics.

The conductive pattern 151 forms a reflective surface of the reflection panel 10. The reflective surface constituted by the conductive pattern 151 may include a metasurface having artificially controlled reflective properties. The conductive pattern 151 of the embodiment has a periodic pattern. The conductive pattern 151 is made of a material having good conductivity, such as Cu, Ni, or Ag, and has a thickness of 10 μm or greater and 50 μm or less.

The adhesive layer 153 bonds the conductive pattern 151 to the dielectric layer 14, and has a relative permittivity and a dissipation factor within respective predetermined ranges that can suppress deterioration in reflection efficiency of the reflection panel 1. As the adhesive layer 153, it is possible to use a material made of a resin, such as a vinyl acetate resin, an acrylic resin, a cellulose resin, an aniline resin, an ethylene resin, a silicone resin, or the like, and satisfying a predetermined relative permittivity and dissipation factor. The thickness of the adhesive layer 153 is 2 μm or greater and 50 μm or less thick, and is preferably 10 μm or greater and 50 μm or less thick from the viewpoint of ensuring adhesive strength.

As illustrated in FIG. 4B, the reflection panel 10B includes, in addition to the structures illustrated in FIG. 4A, an intermediate layer 16 covering the conductive pattern 151, a dielectric substrate 17 bonded on a side where the conductive pattern 151 is by the intermediate layer 16, an intermediate layer 12 covering the ground layer 13, and a dielectric substrate 11 bonded on a side where the ground layer 13 is by the intermediate layer 12.

The intermediate layer 16 protects the surface of the conductive pattern 151 and also adheres and holds the dielectric substrate 17. The intermediate layer 16 preferably has durability and moisture resistance, and for example, ethylene-vinyl acetate (EVA) copolymer or cycloolefin polymer (COP) can be used. The thickness of the intermediate layer 16 is 10 μm to 400 μm.

As the outermost layer of the reflection panel 10B, the dielectric substrate 17 is preferably made of a material having excellent impact resistance, durability, and transparency. The dielectric substrate 17 may be made of polycarbonate, an acrylic resin, PET, or the like. The thickness of the intermediate layer 17 is, for example, 1.0 mm or greater and 10.0 mm or less.

The intermediate layer 12 protects the surface of the ground layer 13 and adheres and holds the dielectric substrate 11. The intermediate layer 12 preferably has durability and moisture resistance, and for example, ethylene-vinyl acetate (EVA) copolymer or cycloolefin polymer (COP) can be used. The thickness of the intermediate layer 12 is 10 μm to 400 μm.

As the outermost layer of the reflection panel 10B, the dielectric substrate 11 is preferably made of a material having excellent impact resistance, durability, and transparency. The dielectric substrate 11 may be made of polycarbonate, an acrylic resin, PET, or the like. The thickness of the intermediate layer 11 is, for example, 1.0 mm to 10.0 mm.

By bonding the conductive pattern 151 covered with the intermediate layer 16 to the dielectric substrate 17, the entry of moisture and air into the surface of the conductive layer 151 is suppressed, and the surface deterioration of the conductive pattern 151 is thereby suppressed. By bonding the ground layer 13 covered with the intermediate layer 12 to the dielectric substrate 11, the entry of moisture and air into the surface of the ground layer 13 is suppressed, and the surface deterioration of the ground layer 13 is thereby suppressed. Accordingly, the capacitance between the ground layer 13 and the conductive pattern 151 may be maintained to be constant, and the designed magnitude of a phase delay may be thereby maintained. In other words, the reflection efficiency of the radio waves in the designed direction can be maintained.

From the viewpoint of maintaining the reflection efficiency of the reflection panels 10 at 60% or more, more preferably 70% or more, the relative permittivity and the dissipation factor of the adhesive layer 153 are designed to be in respective suitable ranges. Specifically, it is desirable that, in a range of 1 GHz or more and 30 GHz or less, the adhesive layer 153 has a relative permittivity of 2.0 or greater and less than 3.0 and a dissipation factor of greater than 0.00 and less than 0.10, or a relative permittivity of 3.0 or greater and less than 4.5 and a dissipation factor of greater than 0.00 and 0.02 or less.

Generally, a low dissipation factor is desirable to suppress a loss in electric energy within the adhesive layer 153. Similarly, a higher relative permittivity leads to a greater loss with respect particularly to high frequency. The relationship with a relative permittivity and a dissipation factor of the dielectric layer 14 also matters. Accordingly, suitable ranges of a relative permittivity and a dissipation factor of the adhesive layer 15 so that a reflection efficiency of 60% or more can be maintained are considered.

Figure 5:
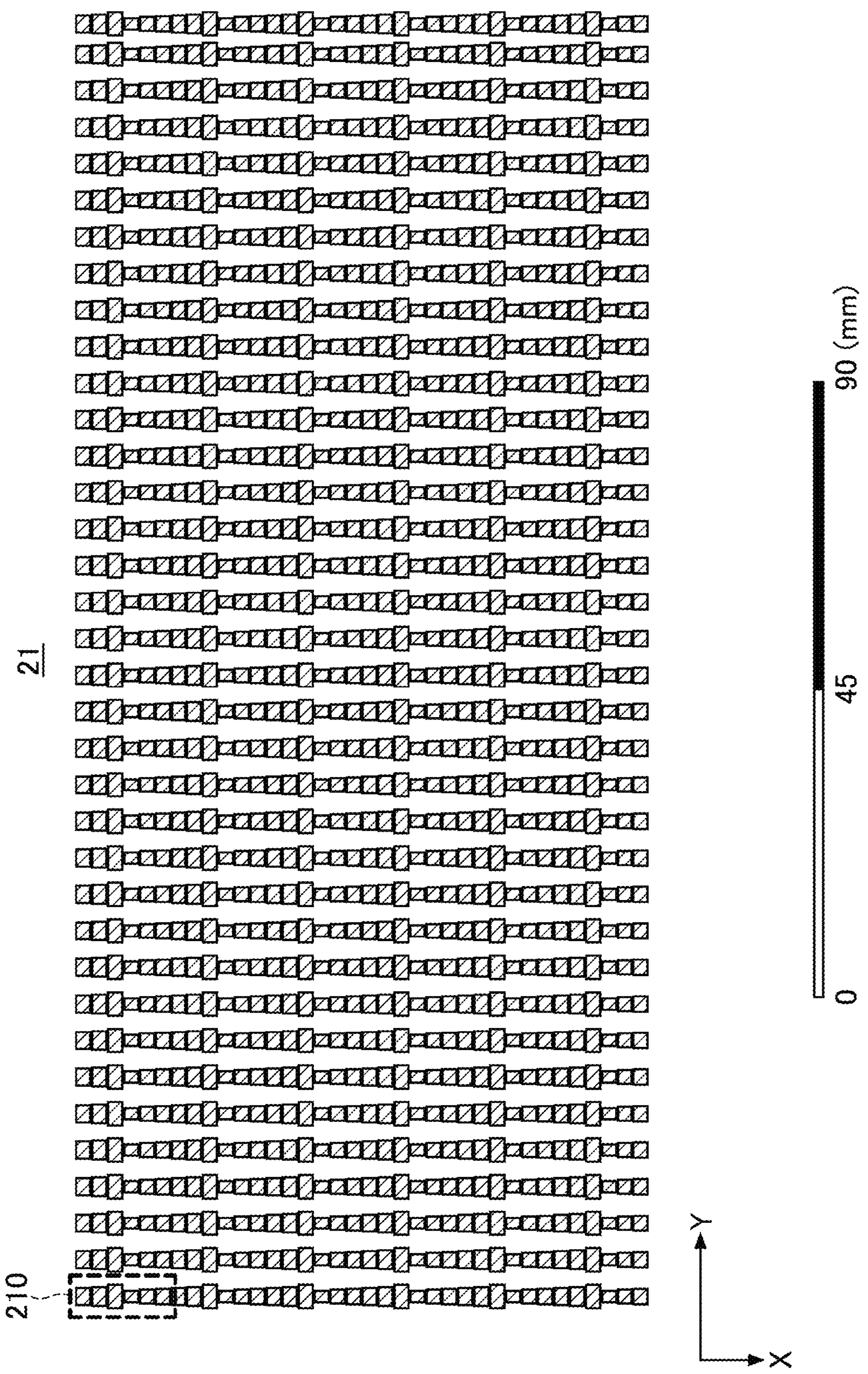
FIG. 5 is a diagram illustrating a conductive pattern model used for evaluation of reflection characteristics.

FIG. 5 is a diagram illustrating a model 21 of the conductive pattern 151 used for evaluation of the reflection characteristics of the reflection panel 10. The model 21 for evaluation includes a periodic array of unit cells (also referred to as "supercells") 210. The unit cells 210 are arranged in six rows in the X direction and 36 columns in the Y direction, and constitute a metasurface that reflects electromagnetic waves at an angle different from an angle of incidence.

Figure 6:
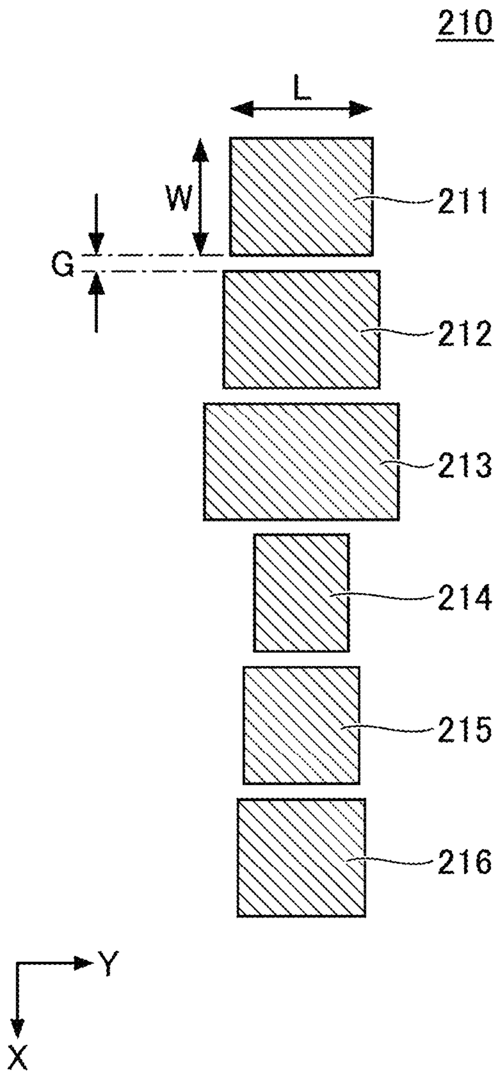
FIG. 6 is a schematic diagram illustrating a structure of a unit cell of the model illustrated in FIG. 5.

FIG. 6 is a schematic diagram illustrating the structure of the unit cell 210 of the model 21. The unit cell 210 is constituted by six metal patches 211, 212, 213, 214, 215, and 216. The width (W) direction and the length (L) direction of the metal patches 211 through 216 correspond to the width (X) direction and the height (Y) direction of the reflection panel 10 of FIG. 1, respectively. The metal patches 211 through 216 have the same width W and different lengths L but have the same central axis of the length (the Y coordinate positions of the central axis are the same). The pitch in the X direction is uniform. The phase of reflection is controlled by the shape and size of the metal patches 211 through 216, with which a gap G between metal patches is set so as to be a predetermined pitch, and a reflected beam is formed in a desired direction by superposition of reflected waves. In this example, each unit cell 210 is designed in such a manner that the peak of a reflected wave of a normal incidence of an electromagnetic wave (incident angle of 0°) appears in a direction of 50° from the normal.

The evaluation is conducted in the following manner: a plane wave of 1 GHz and 28.0 GHz is made incident at an incident angle of 0°, using the conductive pattern 151 of the model 21 of FIG. 5, and the scattering cross section of the reflected wave is analyzed by general-purpose three-dimensional electromagnetic field simulation software. The scattering cross section, namely a radar cross section (RCS), is used as an indicator of the ability to reflect incident electromagnetic waves.

For the case of a metasurface that reflects an incident wave at a reflection angle different from an angle of incidence, calculated power reflection efficiency needs to be corrected. An ideal conductive plate is perfectly specular and reflects electromagnetic waves in the same direction for normal incidence, whereas a metasurface reflects electromagnetic waves in a direction different from an angle of incidence. The power reflection efficiency of the metasurface is obtained by dividing the power reflection efficiency calculated from a gain value by a correction value.

If a reflected electric field in the metasurface without loss determined by the model pattern of FIG. 5 is $E_{MR}$, and a reflected electric field in the ideal conductive plate is $E_{PEC}$, the correction value $\varepsilon_p$ is $|E_{MR}/E_{PEC}|^2$. $|E_{MR}/E_{PEC}|$ can be expressed as follows:

$$\left|\frac{E_{MR}}{E_{PEC}}\right| = \frac{\sqrt{|\cos\theta|}}{|\cos\varphi|}$$ [Math. 1]

or $$\left|\frac{E_{MR}}{E_{PEC}}\right| = \frac{\sqrt{|\cos\theta_i\cdot\cos\theta_r|}}{|\cos\varphi|}$$ [Math. 2]

where θ is an angle of incidence on the metasurface, and φ is a corresponding angle of reflection in the case of regular reflection. If the angle of reflection θ on the metasurface is 50° (or θr=50°), the angle of incidence ωi is 0°, and the angle of reflection φ for the regular reflection is 25°, the correction value $\varepsilon_p$ is 0.7826.

Figure 7:
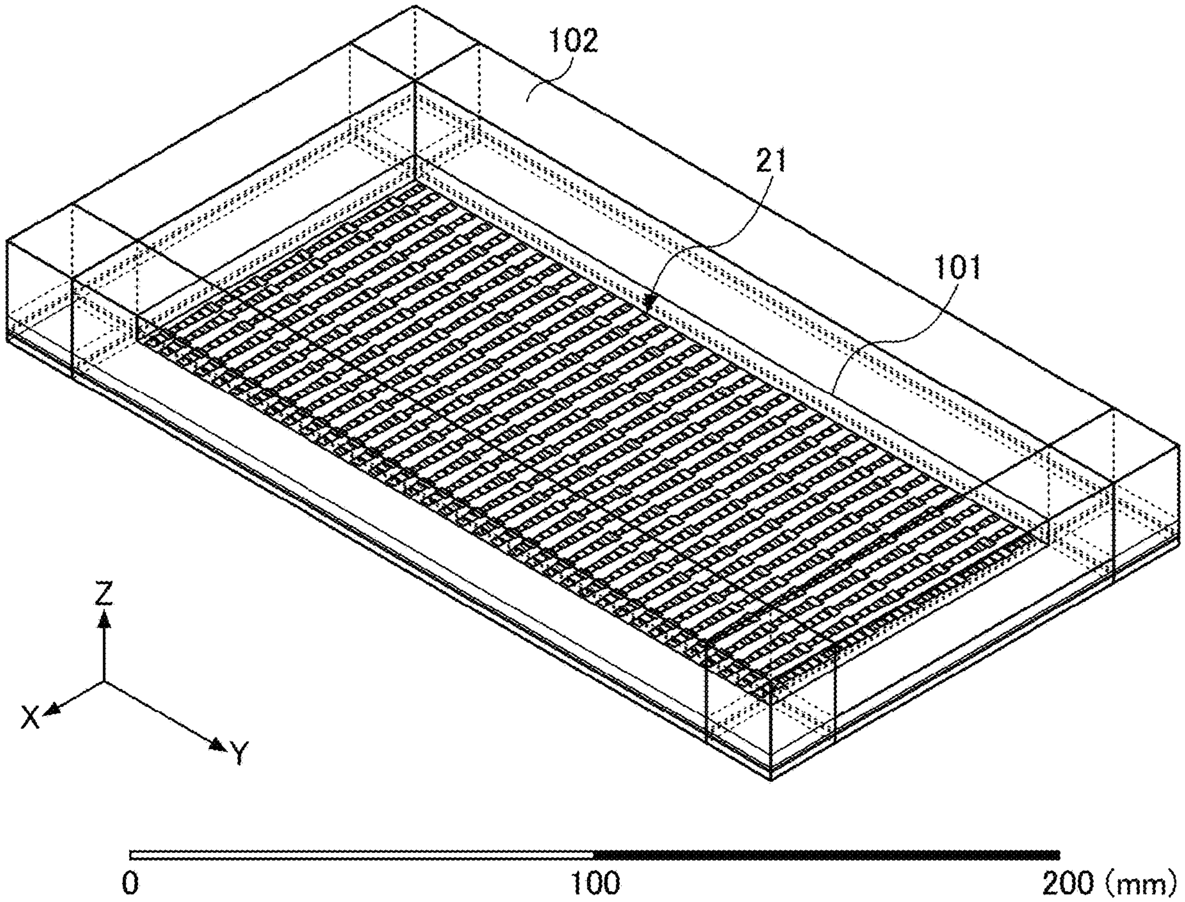
FIG. 7 is a diagram illustrating an analysis space.

FIG. 7 illustrates an analysis space 101 of the electromagnetic wave simulation. Defining the thickness direction of the layer structure of the reflection panel 10 as the Z direction, the width direction of the metal patch of the model 21 in FIG. 5 as the X direction, and the length direction as the Y direction, the analysis space is expressed as (a dimension in the X direction)×(a dimension in the Y direction)×(a dimension in the Z direction). Suppose the dimensions of the analysis space 101 are 83.9 mm×192.6 mm×3.7 mm if the incident electromagnetic wave has a frequency of 28.0 GHz. The boundary condition is designed on an assumption that the electromagnetic wave absorber 102 is arranged around the analysis space 101.

Figure 8A:
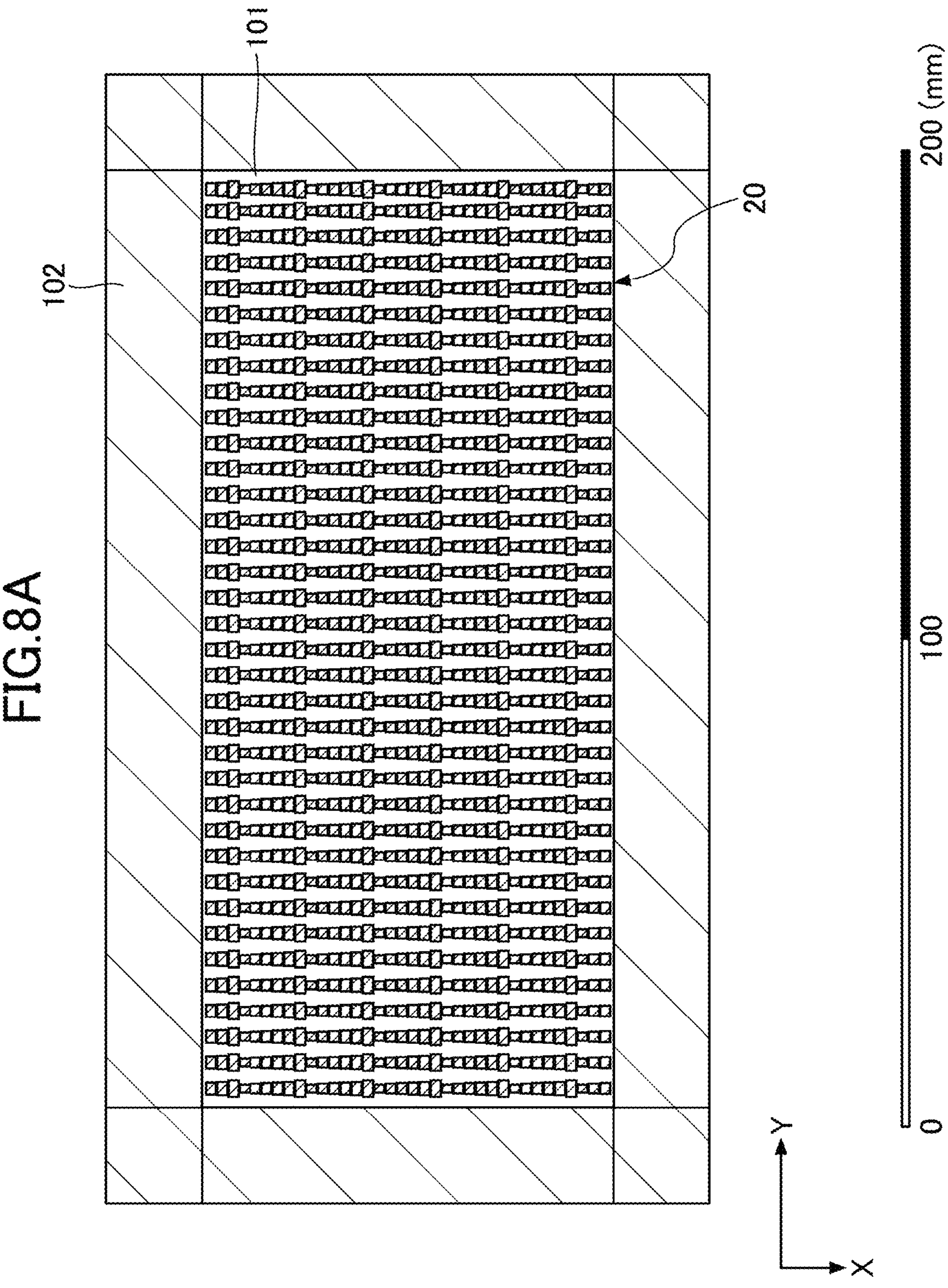
FIG. 8A is a schematic diagram of an XY plane of the analysis space.
Figure 8B:
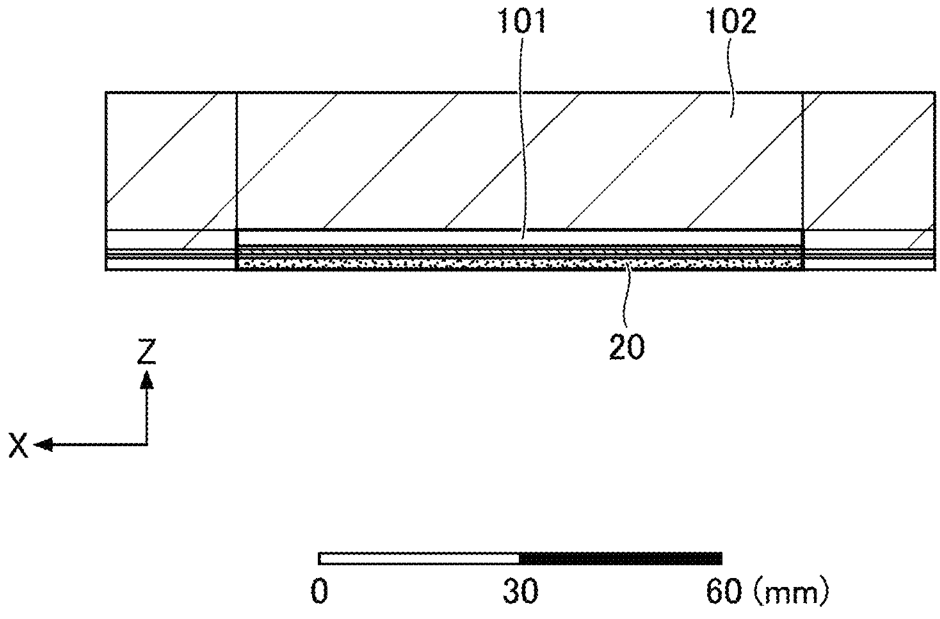
FIG. 8B is a schematic diagram of an XZ plane of the analysis space.
Figure 8C:
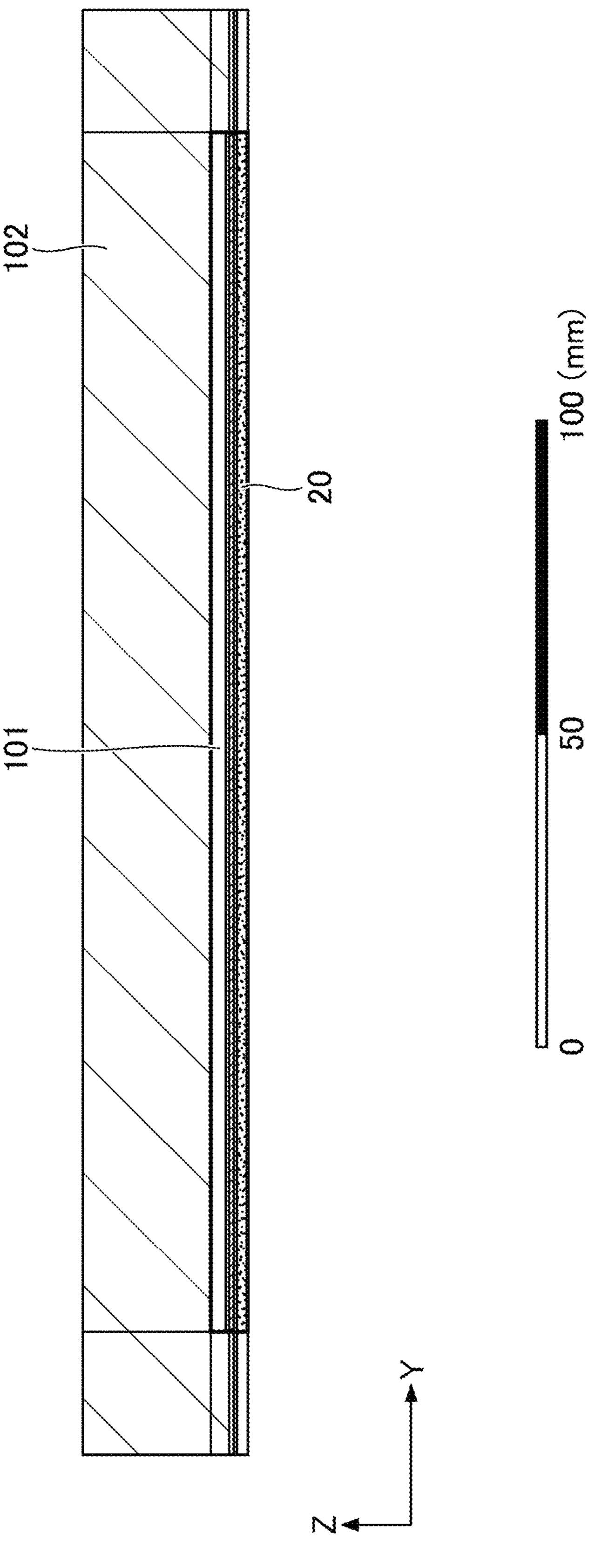
FIG. 8C is a schematic diagram of a YZ plane of the analysis space.

FIG. 8A is a schematic diagram of the XY plane of the analysis space 101 surrounded by the electromagnetic absorber 102; FIG. 8B is a schematic diagram of the XZ plane of the analysis space 101; and FIG. 8C is a schematic diagram of the YZ plane of the analysis space 101. The power reflection efficiency is calculated by changing the relative permittivity and the dissipation factor of the adhesive layer 153 that supports the conductive pattern 151 in the analysis space 101. Assume that the same conductive pattern 151 is used in all simulations. Six conductive patterns 151 constituting the unit cell 210 are formed in a rectangular shape having a uniform width W of 0.4 mm, and lengths L are set to 2.9751 mm, 3.0739 mm, 3.7536 mm, 2.0344 mm, 2.7300 mm, and 2.8497 mm, respectively. The pitch (center-to-center distance) between the metallic patches in the X direction is uniformly 1.9283 mm.

Example 1

A polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 is arranged, with the entirely covering adhesive layer 153 having a thickness of 0.05 mm being interposed therebetween. The conductive pattern 151 is made of a copper foil having a thickness of 0.05 mm and has the above-described pattern shape of the unit cell 210. The relative permittivity of the adhesive layer 153 at 28 GHz is 2.0 and the dissipation factor is 0.01. The gain value (a peak value of a reflected waveform) at 50° in the RCS plot in the case where a plane wave of 28.0 GHz incident at an angle of incidence of 0° is reflected at an angle of reflection of 50° is 11.0450 dB. The power reflection efficiency after correcting this gain value with the correction value $\varepsilon_p$=0.7826 is 69.6%. With the relative permittivity and dissipation factor of the adhesive layer 153 of Example 1, a power reflection efficiency of 60% or more can be achieved.

Example 2

In Example 2, the conditions are the same as those in Example 1, except that the dissipation factor of the adhesive layer 153 is 0.02. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the entirely covering adhesive layer 153 having a thickness of 0.05 mm interposed therebetween. The adhesive layer 153 has a relative permittivity of 2.0 and a dissipation factor of 0.02 at the frequency of 28 GHz. The gain value (a peak value of a reflected waveform) at 50° in the RCS plot in the case where a plane wave of 28.0 GHz incident at an angle of incidence of 0° is reflected at an angle of reflection of 50° is 10.9815 dB. The power reflection efficiency after correcting this gain value with the correction value $\varepsilon_p$=0.7826 is 68.6%. With the relative permittivity and dissipation factor of the adhesive layer 153 of Example 2, a power reflection efficiency of 60% or more can be achieved.

Example 3

In Example 3, the conditions are the same as those in Examples 1 and 2, except that the dissipation factor of the adhesive layer 153 is 0.03. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the entirely covering adhesive layer 153 having a thickness of 0.05 mm interposed therebetween. The adhesive layer 153 has a relative permittivity of 2.0 and a dissipation factor of 0.03 at the frequency of 28 GHz. The gain value (a peak value of a reflected waveform) at 50° in the RCS plot in the case where a plane wave of 28.0 GHz incident at an angle of incidence of 0° is reflected at an angle of reflection of 50° is 10.8111 dB. The power reflection efficiency after correcting this gain value with the correction value $\varepsilon_p$=0.7826 is 65.9%. With the relative permittivity and dissipation factor of the adhesive layer 153 of Example 3, a power reflection efficiency of 60% or more can be achieved.

Example 4

In Example 4, the conditions are the same as those in Example 1, except that the relative permittivity of the adhesive layer 153 is 2.5. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the entirely covering adhesive layer 153 having a thickness of 0.05 mm interposed therebetween. The adhesive layer 153 has a relative permittivity of 2.5 and a dissipation factor of 0.01 at the frequency of 28 GHz. The gain value (a peak value of a reflected waveform) at 50° in the RCS plot in the case where a plane wave of 28.0 GHz incident at an angle of incidence of 0° is reflected at an angle of reflection of 50° is 11.3079 dB. The power reflection efficiency after correcting this gain value with the correction value $\varepsilon_p$=0.7826 is 73.9%.

In Example 4, regardless of the increase of the relative permittivity of the adhesive layer 153 at the frequency of 28 GHz to 2.5, a power reflection efficiency of 70% or more is achieved. A reason for this can be considered to be a smaller difference from the relative permittivity of the polycarbonate of the dielectric layer 14 at the frequency of 28 GHz (2.785). In Example 4, the relative permittivity is fixed to 2.5 and the dissipation factor is increased to 0.02 and 0.03 to calculate the power reflection efficiency. The gain value at 50° is 11.1920 dB if the relative permittivity is 2.5 and the dissipation factor is 0.02, and the power reflection efficiency after correcting this gain value with the correction value $\varepsilon_p$=0.7826 is 72.0%. The gain value at 50° is 11.0800 dB if the relative permittivity is 2.5 and the dissipation factor is 0.03, and the power reflection efficiency after correcting this gain value with the correction value $\varepsilon_p$=0.7826 is 70.2%; therefore, a power reflection efficiency of 70% or more can be achieved in both cases.

Example 5

In Example 5, the conditions are the same as those in Example 4, except that the relative permittivity of the adhesive layer 153 is 3.0. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the entirely covering adhesive layer 153 having a thickness of 0.05 mm interposed therebetween. The adhesive layer 153 has a relative permittivity of 3.0 and a dissipation factor of 0.01 at the frequency of 28 GHz. The gain value (a peak value of a reflected waveform) at 50° in the RCS plot in the case where a plane wave of 28.0 GHz incident at an angle of incidence of 0° is reflected at an angle of reflection of 50° is 10.5895 dB. The power reflection efficiency after correcting this gain value with the correction value $\varepsilon_p$=0.7826 is 62.7%.

In Example 5, although the loss of high-frequency energy is increased as the relative permittivity of the adhesive layer 153 at 28 GHz is increased to 3.0, the consistency with the relative permittivity of the dielectric layer 14 is good and a power reflection efficiency of 60% or more is therefore achieved. In Example 5, the relative permittivity is fixed to 3.0 and the dissipation factor is increased to 0.02 to calculate the power reflection efficiency. The gain value at 50° is 10.4950 dB if the relative permittivity is 3.0 and the dissipation factor is 0.02, and the power reflection efficiency after correcting this gain value with the correction value $\varepsilon_p$=0.7826 is 61.3%; therefore, a power reflection efficiency of 60% or more can be achieved.

Example 6

In Example 6, the conditions are the same as those in Example 4, except that the relative permittivity of the adhesive layer 153 is 3.5. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the entirely covering adhesive layer 153 having a thickness of 0.05 mm interposed therebetween. The adhesive layer 153 has a relative permittivity of 3.5 and a dissipation factor of 0.01 at the frequency of 28 GHz. The gain value (a peak value of a reflected waveform) at 50° in the RCS plot in the case where a plane wave of 28.0 GHz incident at an angle of incidence of 0° is reflected at an angle of reflection of 50° is 10.5542 dB. The power reflection efficiency after correcting this gain value with the correction value $\varepsilon_p$=0.7826 is 62.2%.

In Example 6, although the loss of high-frequency energy is increased as the relative permittivity of the adhesive layer 153 at 28 GHz is increased to 3.5, a power reflection efficiency of 60% or more is still achieved. In Example 6, the relative permittivity is fixed to 3.5 and the dissipation factor is further increased to 0.02 to calculate the power reflection efficiency. The gain value at 50° is 10.4760 dB if the relative permittivity is 3.5 and the dissipation factor is 0.02, and the power reflection efficiency after correcting this gain value with the correction value $\varepsilon_p$=0.7826 is 61.0%; therefore, a power reflection efficiency of 60% or more can be achieved.

Example 7

In Example 7, the conditions are the same as those in Example 4, except that the relative permittivity of the adhesive layer 153 is 4.0. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the entirely covering adhesive layer 153 having a thickness of 0.05 mm interposed therebetween. The adhesive layer 153 has a relative permittivity of 4.0 and a dissipation factor of 0.01 at the frequency of 28 GHz. The gain value (a peak value of a reflected waveform) at 50° in the RCS plot in the case where a plane wave of 28.0 GHz incident at an angle of incidence of 0° is reflected at an angle of reflection of 50° is 10.7307 dB. The power reflection efficiency after correcting this gain value with the correction value $\varepsilon_p$=0.7826 is 64.7%.

In Example 7, regardless of the increase of the relative permittivity of the adhesive layer 153 at the frequency of 28 GHz to 4.0, a power reflection efficiency of 60% or more is still achieved. In Example 7, the relative permittivity is fixed to 4.0 and the dissipation factor is further increased to 0.02 to calculate the power reflection efficiency. The gain value at 50° is 10.5500 dB if the relative permittivity is 4.0 and the dissipation factor is 0.02, and the power reflection efficiency after correcting this gain value with the correction value $\varepsilon_p$=0.7826 is 62.1%; therefore, a power reflection efficiency of 60% or more can be achieved.

Example 8

In Example 8, the conditions are the same as those in Example 4, except that the dissipation factor of the adhesive layer 153 at 28 GHz is 0.05, and the relative permittivity is changed to 2.00 and 2.50. If the relative permittivity is 2.00 and the dissipation factor is 0.05, the gain value (a peak value of a reflected waveform) at 50° in the RCS plot in the case where a plane wave of 28.0 GHz incident at an angle of incidence of 0° is reflected at an angle of reflection of 50° is 10.6191 dB. The power reflection efficiency after correcting this gain value with the correction value $\varepsilon_p$=0.7826 is 63.1%. If the relative permittivity is 2.50 and the dissipation factor is 0.05, the gain value (a peak value of a reflected waveform) at 50° in the RCS plot in the case where a plane wave of 28.0 GHz incident at an angle of incidence of 0° is reflected at an angle of reflection of 50° is 10.8744 dB. The power reflection efficiency after correcting this gain value with the correction value $\varepsilon_p$=0.7826 is 66.9%. In the case where the relative permittivity is 2.5, a reflection efficiency of 60% or more can be achieved if the dissipation factor is 0.05 or less.

Example 9

In Example 9, suitable ranges of the relative permittivity and the dissipation factor at 1 GHz are studied. In Example 9, the conditions are the same in those in Example 1, except for the relative permittivity of the adhesive layer 153. Specifically, a polycarbonate film having a thickness of 0.7 mm is used as the dielectric layer 14. On one surface of the polycarbonate film, an Ag-based multilayer film having a thickness of 0.36 mm is set as the ground layer 13. On the other surface of the polycarbonate film, the conductive pattern 151 formed of a copper film having a thickness of 0.05 mm is arranged, with the adhesive layer 153 having a thickness of 0.05 mm and provided on the entire surface. The gain value (a peak value of a reflected waveform) at 50° in the RCS plot in the case where a plane wave of 1.0 GHz incident at an angle of incidence of 0° is reflected at an angle of reflection of 50° is calculated, and the power reflection efficiency is calculated after the gain value is corrected with the correction value $\varepsilon_p$=0.7826.

If the dissipation factor of the adhesive layer 153 at 1 GHz is fixed to 0.01 and the relative permittivity is increased from 2.1, a power reflection efficiency of 60% or more can be achieved if the relative permittivity is less than 4.5. Particularly, a power reflection efficiency of 69.6% is achieved if the relative permittivity is 2.1; a power reflection efficiency of 70% or more is achieved if the relative permittivity is 2.2 or greater and 2.7 or less; and a power reflection efficiency of 67.8% is achieved if the relative permittivity is 2.8. The relative permittivity in the case where the dissipation factor is 0.01, the gain values, and specific calculation results of the power reflection efficiency after the gain value correction are shown in Table 1.

TABLE 1

| Relative permittivity at 1 GHz | Dissipation factor at 1 GHz | Gain value (dB) | Power reflection efficiency (%) |
|---|---|---|---|
| 2.1 | 0.01 | 11.0450 | 69.6 |
| 2.2 | 0.01 | 11.2350 | 72.7 |
| 2.3 | 0.01 | 11.3250 | 74.2 |
| 2.4 | 0.01 | 11.3840 | 75.2 |
| 2.5 | 0.01 | 1.2960 | 73.7 |
| 2.6 | 0.01 | 11.3080 | 73.9 |
| 2.7 | 0.01 | 11.1470 | 71.2 |
| 2.8 | 0.01 | 10.9340 | 67.8 |
| 2.9 | 0.01 | 10.6930 | 64.2 |
| 3.0 | 0.01 | 10.6460 | 63.5 |
| 3.5 | 0.01 | 10.5900 | 62.7 |
| 4.0 | 0.01 | 10.5540 | 62.2 |
| 4.5 | 0.01 | 10.3180 | 58.9 |

Example 10

In Example 10, the relative permittivity of the adhesive layer 153 at 1 GHz is fixed to 2.1, and the dissipation factor is increased to 0.02, 0.03, 0.05, 0.08, and 0.09. Other conditions and the evaluation method are the same as those in Examples 1 through 9. If the relative permittivity at 1 GHz is 2.1, the gain value of the RCS plot if the angle of incidence is 0° and the angle of reflection is 50°, and the power reflection efficiency after the gain value is corrected with the correction value $\varepsilon_p$=0.7826 are as follows:

If the dissipation factor is 0.02, the gain value is 11.1414 dB, and the power reflection efficiency is 71.1%; if the dissipation factor is 0.03, the gain value is 11.0006 dB, and the power reflection efficiency is 68.9%; if the dissipation factor is 0.05, the gain value is 10.8475 dB, and the power reflection efficiency is 66.5%; if the dissipation factor is 0.08, the gain value is 10.53304 dB, and the power reflection efficiency is 61.8%; if the dissipation factor is 0.09, the gain value is 10.4147 dB, and the power reflection efficiency is 60.2%. Thus, if the relative permittivity is 2.1, a power reflection efficiency of 60% or more can be achieved with a dissipation factor in the range of greater than 0.00 and 0.09 or less for an electromagnetic wave of 1 GHz.

Example 11

In Example 11, the relative permittivity of the adhesive layer 153 at 1 GHz is fixed to 2.3, and the dissipation factor is increased to 0.02, 0.03, 0.05, 0.08, 0.09, and 0.10. Other conditions and the evaluation method are the same as those in Examples 1 through 10. If the relative permittivity at 1 GHz is 2.3, the gain value of the RCS plot if the angle of incidence is 0° and the angle of reflection is 50°, and the power reflection efficiency after the gain value is corrected with the correction value $\varepsilon_p$=0.7826 are as follows:

If the dissipation factor is 0.02, the gain value is 11.2100 dB, and the power reflection efficiency is 72.3%; if the dissipation factor is 0.03, the gain value is 11.1410 dB, and the power reflection efficiency is 71.1%; if the dissipation factor is 0.05, the gain value is 10.9537 dB, and the power reflection efficiency is 68.1%; if the dissipation factor is 0.08, the gain value is 10.6827 dB, and the power reflection efficiency is 64.0%; if the dissipation factor is 0.09, the gain value is 10.5260 dB, and the power reflection efficiency is 61.7%; if the dissipation factor is 0.10, the gain value is 10.4297 dB, and the power reflection efficiency is 60.4%. Thus, if the relative permittivity is 2.3, a power reflection efficiency of 60% or more can be achieved with a dissipation factor in the range of greater than 0.00 and 0.10 or less for an electromagnetic wave of 1 GHz.

Example 12

In Example 12, the relative permittivity of the adhesive layer 153 at 1 GHz is fixed to 2.5, and the dissipation factor is increased to 0.02, 0.03, 0.05, 0.08, and 0.09. Other conditions and the evaluation method are the same as those in Examples 1 through 10. If the relative permittivity at 1 GHz is 2.5, the gain value of the RCS plot if the angle of incidence is 0° and the angle of reflection is 50°, and the power reflection efficiency after the gain value is corrected with the correction value $\varepsilon_p$=0.7826 are as follows:

If the dissipation factor is 0.02, the gain value is 11.1920 dB, and the power reflection efficiency is 72.0%; if the dissipation factor is 0.03, the gain value is 11.0800 dB, and the power reflection efficiency is 70.2%; if the dissipation factor is 0.05, the gain value is 10.8774 dB, and the power reflection efficiency is 66.9%; if the dissipation factor is 0.08, the gain value is 10.5331 dB, and the power reflection efficiency is 61.8%; if the dissipation factor is 0.09, the gain value is 10.4354 dB, and the power reflection efficiency is 60.5%. Thus, if the relative permittivity is 2.5, a power reflection efficiency of 60% or more can be achieved with a dissipation factor in the range of greater than 0.00 and 0.09 or less for an electromagnetic wave of 1 GHz.

Example 13

In Example 13, the relative permittivity of the adhesive layer 153 is changed to 3.0, 3.5, and 4.0 for the frequency of 1 GHz, and the dissipation factor is increased from 0.01 in increments of 0.01 for each relative permittivity. Other conditions and the evaluation method are the same as those in Examples 1 through 10. The following results are obtained by calculation:

If the relative permittivity is 3.0 and the dissipation factor of 0.02, the gain of 10.4950 dB and the power reflection efficiency after the gain value correction is 61.3%

If the relative permittivity is 3.5 and the dissipation factor of 0.02, the gain of 10.4760 dB and the power reflection efficiency after the gain value correction is 61.0%

If the relative permittivity is 4.0 and the dissipation factor of 0.02, the gain of 10.631 dB and the power reflection efficiency after the gain value correction is 63.3%

Comparative Example 1

In Comparative Example 1, the conditions are the same as those in Example 1, except that the relative permittivity of the adhesive layer 153 is 4.5. In other words, the relative permittivity of the adhesive layer 153 having a thickness of 0.05 mm at 28 GHz is 4.5 and the dissipation factor is 0.01. The gain value at 50° in the RCS plot in the case where a plane wave of 28.0 GHz incident at an angle of incidence of 0° is reflected at an angle of reflection of 50° is 10.3184 dB. The power reflection efficiency after correcting this gain value with the correction value $\varepsilon_p$=0.7826 is 58.9%, and a power reflection efficiency of 60% or more cannot be achieved.

Comparative Example 2

In Comparative Example 2, the conditions are the same as those in Example 2, except that the relative permittivity of the adhesive layer 153 is 4.5. In other words, the relative permittivity of the adhesive layer 153 having a thickness of 0.05 mm at 28 GHz is 4.5 and the dissipation factor is 0.02. The gain value at 50° in the RCS plot in the case where a plane wave of 28.0 GHz incident at an angle of incidence of 0° is reflected at an angle of reflection of 50° is 10.2456 dB. The power reflection efficiency after correcting this gain value with the correction value $\varepsilon_p$=0.7826 is 57.9%, and a power reflection efficiency of 60% or more cannot be achieved.

Comparative Example 3

In Comparative Example 3, the conditions are the same as those in Example 3, except that the relative permittivity of the adhesive layer 153 is 4.5. In other words, the relative permittivity of the adhesive layer 153 having a thickness of 0.05 mm at 28 GHz is 4.5 and the dissipation factor is 0.03. The gain value at 50° in the RCS plot in the case where a plane wave of 28.0 GHz incident at an angle of incidence of 0° is reflected at an angle of reflection of 50° is 10.1244 dB. The power reflection efficiency after correcting this gain value with the correction value $\varepsilon_p$=0.7826 is 56.3%, and a power reflection efficiency of 60% or more cannot be achieved.

Comparative Example 4

In Comparative Example 4, the relative permittivity of the adhesive layer 153 at 28 GHz is fixed to 3.0, and the dissipation factor is changed to 0.03, 0.05, and 0.10. Other conditions are the same as those in Example 1. If the dissipation factor is 0.03, the gain value at 50° in the RCS plot in the case where a plane wave of 28.0 GHz incident at an angle of incidence of 0° is reflected at an angle of reflection of 50° is 10.3733 dB. The power reflection efficiency after correcting this gain value with the correction value $\varepsilon_p$=0.7826 is 59.6%, and the power reflection efficiency of 60% or more cannot be achieved. If the dissipation factor is 0.05, the power reflection efficiency after the gain value correction is decreased to 57.6%, and if the dissipation factor is 0.10, the gain value correction is further decreased.

Comparative Example 5

In Comparative Example 5, the relative permittivity of the adhesive layer 153 at 28 GHz is set to 3.5, and the dissipation factor is set to 0.03. Other conditions are the same as those in Example 1. The gain value at 50° in the RCS plot in the case where a plane wave of 28.0 GHz incident at an angle of incidence of 0° is reflected at an angle of reflection of 50° is 10.2962 dB. The power reflection efficiency after correcting this gain value with the correction value $\varepsilon_p$=0.7826 is 58.6%, and a power reflection efficiency of 60% or more cannot be achieved.

Comparative Example 6

In Comparative Example 4, the relative permittivity of the adhesive layer 153 at 28 GHz is set to 4.00, and the dissipation factor is set to 0.03. Other conditions are the same as in Example 1. The gain value at 50° in the RCS plot in the case where a plane wave of 28.0 GHz incident at an angle of incidence of 0° is reflected at an angle of reflection of 50° is 10.3971 dB. The power reflection efficiency after correcting this gain value with the correction value $\varepsilon_p$=0.7826 is 59.9%, and a power reflection efficiency of 60% or more cannot be achieved.

Comparative Example 7

In Comparative Example 7, the relative permittivity of the adhesive layer 153 at 1 GHz is fixed to 4.5, and the dissipation factor is changed to 0.01, 0.02, and 0.03. Other conditions and the evaluation method are the same as those in Examples 1 through 8. The following results are obtained by calculation if the relative permittivity at 1 GHz is 4.5:

If the dissipation factor is 0.01, the power reflection efficiency is 58.9%

If the dissipation factor is 0.02, the power reflection efficiency is 57.9%

If the dissipation factor is 0.03, the power reflection efficiency is 56.3%

Comparative Example 8

In Comparative Example 8, the dissipation factor of the adhesive layer 153 at 1 GHz is fixed to 0.10, and the relative permittivity is changed to 2.1, 2.5, and 3.0. Other conditions and the evaluation method are the same as those in Examples 1 through 8. If the dissipation factor at 1 GHz is 0.10, the following results are obtained by calculation:

If the relative permittivity is 2.1, the power reflection efficiency is 59.0%

If the relative permittivity is 2.5, the power reflection efficiency is 47.0%

If the relative permittivity is 3.0, the power reflection efficiency is 50.9%

FIG. 9 illustrates the relationship between the relative permittivity and the dissipation factor of the adhesive layer 153 at 28 GHz and the power reflection efficiency. The results in FIG. 9 correspond to Examples 1 through 8 and Comparative Examples 1 through 4. The vertical column shows the relative permittivity at 28 GHz, and the power reflection efficiency when the dissipation factor is 0.01, 0.02, 0.03, 0.05, and 0.10. The combinations with which a power reflection efficiency of 60% or more can be achieved are indicated with "A", and the combinations with which a power reflection efficiency of less than 60% are indicated with "B".

For electromagnetic waves of 28 GHz, if the relative permittivity of the adhesive layer is 4.0 or less and the dissipation factor is 0.02 or less, a power reflection efficiency of 60% or more can be achieved. Under this circumstance, in the range of the relative permittivity between 2.0 or greater and 2.5 or less, if the dissipation factor is 0.05 or less, a power reflection efficiency of 60% or more can be achieved. If the relative permittivity is 4.5 or greater, on the other hand, a power reflection efficiency of 60% or more cannot be achieved even if the dissipation factor is decreased.

FIG. 10 illustrates the relationship between the relative permittivity and the dissipation factor of the adhesive layer 153 at 1 GHz and the power reflection efficiency. The results in FIG. 10 correspond to Examples 9 through 13 and Comparative Examples 5 through 8. The vertical column shows the relative permittivity at 1 GHz, and the power reflection efficiency when the dissipation factor is 0.01, 0.02, 0.03, 0.05, 0.08, 0.09, and 0.10. Similar to FIG. 9, the combinations with which a power reflection efficiency of 60% or more can be achieved are indicated with "A", and the combinations with which a power reflection efficiency of less than 60% are indicated with "B".

For electromagnetic waves of 1 GHz, if the relative permittivity of the adhesive layer 153 is 4.0 or less and the dissipation factor is 0.02 or less, a power reflection efficiency of 60% or more can be achieved. According to Example 8, in the case where the dissipation factor is 0.01, if the relative permittivity of the adhesive layer 153 is less than 4.5, a power reflection efficiency of 60% or more can be achieved. In this circumstance, if the range of the relative permittivity is 2.1 or greater and 2.9 or less, a high power reflection efficiency can be achieved for the dissipation factor is 0.03 or less. If the relative permittivity is 4.5 or greater, on the other hand, a power reflection efficiency of 60% or more cannot be achieved even if the dissipation factor is decreased.

From the results of Examples 1 through 13 and Comparative Examples of 1 through 8 as illustrated in FIGS. 9 and 10, it can be understood that in the case where the adhesive layer 153 covering the entirety of one of the surfaces of the dielectric layer 14 is provided, a power reflection efficiency of 60% or more can be achieved if the relative permittivity of the adhesive layer 153 is 2.0 or greater and less than 3.0 and the dissipation factor is greater than 0.00 and less than 0.10 within the range of 1 GHz or more and 30 GHz or less. It can also be understood that if the relative permittivity of the adhesive layer 153 is 3.0 or greater and less than 4.5 and the dissipation factor is greater than 0.00 and 0.02 or less, a power reflection efficiency of 60% or more can be achieved. In particular, a high power reflection efficiency can be achieved if the relative permittivity is 2.2 or greater and 2.7 or less and the dissipation factor is greater than 0.00 and 0.09 or less.

In above-described Examples 1 to 13, the calculation is performed on the assumption that a higher frequency is set to 28 GHz; however, there are no significant differences in the calculation results as long as the frequency is in the range of 28 GHz±4 GHz, and the calculation results approximate in the range from 1 GHz and 28 GHz±2 GHz. As the dissipation factor becomes smaller, the reflection energy loss becomes smaller; therefore, in the case where the dissipation factor is smaller than 0.01, a power reflection efficiency of 60% or more can be achieved. For example, under the above-described conditions for evaluation, the relative permittivity at 28 GHz is 2.0, and the dissipation factor is 0.001, the gain value at 50° of the RCS plot is 11.1541 dB, and the corrected power reflection efficiency is 71.4%. The relative permittivity at 28 GHz is 2.5, and the dissipation factor is 0.001, the gain value at 50° of the RCS plot is 11.4248 dB, and the corrected power reflection efficiency is 75.9%. Such a high power reflection efficiency is applicable to the case where incident electromagnetic waves of 1 GHz. Although the power reflection efficiency is calculated for the case where the thickness of the conductive pattern 151 is 0.05 mm in Examples 1 through 13, the power reflection efficiency is not so greatly affected by the thickness of the conductive pattern 151. Even in the case where the thickness of the conductive pattern 151 is 0.01 mm or greater and 0.05 mm or less, the above-described ranges of the relative permittivity and the dissipation factor of the adhesive layer 153 are applicable.

The power reflection efficiency is affected by the occupancy of the conductive pattern with respect to the dielectric layer 14, rather than the thickness of the conductive pattern 151. The occupancy of the conductive layer 151 adhered by the adhesive layer 153 is, for example, 10.0% or more and 45.0% or less. If the occupancy of the conductive pattern 151 is less than 10%, there are some cases where it is difficult to realize reflection characteristics and reflection efficiency in a desired direction. If the occupancy of the conductive pattern 151 exceeds 45%, there is a possibility that a visible transmittance may reduce. At a site where the transparency is not required for the reflection panel 10, the occupancy of the conductive pattern 151 may exceed 45%.

The above ranges of the relative permittivity and the dissipation factor of the adhesive layer 153 are applicable to the configuration of FIG. 4B. In other words, the intermediate layer 16 may cover the conductive pattern 151 adhered by the adhesive layer 153 having a relative permittivity of 2.0 or greater and less than 3.0 and the dissipation factor of greater than 0.00 and less than 0.10, or the adhesive layer 153 having a relative permittivity of 3.0 or greater and less than 4.5 and the dissipation factor of greater than 0.00 and 0.02 or less. By covering the conductive pattern 151 and the adhesive layer 153 with the intermediate layer 16, it is possible to suppress a change in the surface state of the conductive pattern 151 due to the influence of oxygen, moisture, or the like, and weather resistance is therefore improved.

In the case where the dielectric substrate 17 is bonded above the conductive pattern 151 with the intermediate layer 16 interposed therebetween, the impact resistance and durability of the reflective panel 10 are improved. The thickness of the intermediate layer 16 in this case may be a thickness that can secure moisture resistance and protection for the conductive pattern 151 and that is capable of bonding the dielectric substrate 17. For example, an adhesive film having a thickness of 10 μm or greater and 400 μm or less can be used as the intermediate layer 16. The same applies to the intermediate layer 12 provided on the side where the ground layer 13 is.

The electromagnetic wave reflecting device of the embodiment is not limited to the foregoing configuration example. The reflection angle with respect to the normal incidence can be appropriately designed in a range of 35° or greater and less than 90° by designing the size, shape, and pitch of the conductive pattern 151 and the dielectric constant of the dielectric layer 14. The in-plane size of the reflection panel 10 of the electromagnetic wave reflecting device can be selected as appropriate within a range from 30 cm×30 cm to 3 m×3 m. The entire surface of the reflection panel 10 may be a metasurface, or a part of the reflection panel 10 may be a metasurface and the remaining part may be a specular reflection surface. In this case, the dielectric substrate may be bonded to the reflective surface after covering the entire surface of the reflective surface with an adhesive film (intermediate layer) having high moisture resistance and durability.

What is claimed is:

1. An electromagnetic wave reflecting device, comprising:
- a reflection panel that reflects radio waves of a desired band selected from a frequency band of 1 GHz or more and 170 GHz or less; and
- a frame that holds the reflection panel, wherein
- the reflection panel includes
  - a dielectric layer,
  - a conductive pattern provided on one surface of the dielectric layer, the conductive pattern being periodic,
  - a ground layer provided on an other surface of the dielectric layer, and
  - an adhesive layer that bonds the conductive pattern to the one surface of the dielectric layer,
- the adhesive layer covers an entirety of the one surface of the dielectric layer, and
- in a range of 1 GHz or more and 30 GHz or less, a relative permittivity of the adhesive layer is 2.0 or greater and less than 3.0 and a dissipation factor of the adhesive layer is greater than 0.00 and less than 0.10, or a relative permittivity of the adhesive layer is 3.0 or greater and less than 4.5 and a dissipation factor of the adhesive layer is greater than 0.00 and 0.02 or less.

2. The electromagnetic wave reflecting device according to claim 1, wherein
- for the frequency of 1 GHz or more and 30 GHz or less, the relative permittivity of the adhesive layer is 2.2 or greater and 2.7 or less, and the dissipation factor is 0.09 or less.

3. The electromagnetic wave reflecting device according to claim 1, wherein
- a thickness of the conductive pattern is 0.01 mm or greater and 0.05 mm or less, and an occupancy of the conductive pattern with respect to the dielectric layer is 10.0% or more and 45.0% or less.

4. The electromagnetic wave reflecting device according to claim 1, further comprising:
- an intermediate layer covering the adhesive layer and the conductive pattern.

5. The electromagnetic wave reflecting device according to claim 4 further comprising:
- a dielectric substrate bonded on a side where the conductive pattern is by the intermediate layer.

6. An electromagnetic wave reflecting fence, wherein
- a plurality of electromagnetic wave reflecting devices are connected by the frame, each of the electromagnetic wave reflecting devices being the electromagnetic wave reflecting device of claim 1.

7. The electromagnetic wave reflecting fence according to claim 6, wherein
- at least a part of the reflection panel is a metasurface having an angle of incidence and an angle of reflection, the angle of reflection differing from the angle of incidence.

8. A reflection panel used in an electromagnetic wave reflecting device, the reflection panel comprising:
- a dielectric layer;
- a conductive pattern provided on one surface of the dielectric layer, the conductive pattern being periodic;
- a ground layer provided on an other surface of the dielectric layer; and
- an adhesive layer that bonds the conductive pattern to the one surface of the dielectric layer, wherein
- the adhesive layer covers an entirety of the one surface of the dielectric layer, and
- in a range from 1 GHz or more and 30 GHz or less, a relative permittivity of the adhesive layer is 2.0 or more and less than 3.0 and a dissipation factor of the adhesive layer is greater than 0.00 and less than 0.10, or a relative permittivity of the adhesive layer is 3.0 or more and less than 4.5 and a dissipation factor of the adhesive layer is greater than 0.00 and 0.02 or less.

9. The reflection panel according to claim 8, wherein
- for the frequency of 1 GHz or more and 30 GHz or less, the relative permittivity of the adhesive layer is 2.2 or greater and 2.7 or less, and the dissipation factor is greater than 0.00 and 0.09 or less.

* * * * *